(12) United States Patent
Schiele et al.

(10) Patent No.: US 8,388,494 B2
(45) Date of Patent: Mar. 5, 2013

(54) METHOD FOR CONTROLLING A HYBRID DRIVE TRAIN OF A VEHICLE

(75) Inventors: Peter Schiele, Kressbronn (DE); Klaus Steinhauser, Kressbronn (DE); Bernd Allgaier, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/274,584

(22) Filed: Oct. 17, 2011

(65) Prior Publication Data

US 2012/0115676 A1    May 10, 2012

(30) Foreign Application Priority Data

Nov. 4, 2010   (DE) .......................... 10 2010 043 355

(51) Int. Cl.
*B60W 10/02*   (2006.01)
*B60W 10/08*   (2006.01)
(52) U.S. Cl. .......................................... 477/5; 477/101
(58) Field of Classification Search .................. 477/2, 3, 477/5–8, 15, 17, 77, 79, 83, 99, 101, 181; 903/930, 946
See application file for complete search history.

(56) References Cited

U.S. PATENT DOCUMENTS

| 6,176,807 | B1 * | 1/2001 | Oba et al. ........................... 477/5 |
| 7,670,257 | B2 | 3/2010 | Popp et al. |
| 7,766,107 | B2 | 8/2010 | Joe et al. |
| 8,123,657 | B2 * | 2/2012 | Mittelberger et al. ............ 477/5 |
| 8,246,509 | B2 * | 8/2012 | Mittelberger et al. ............ 477/5 |
| 2007/0056783 | A1 * | 3/2007 | Joe et al. ....................... 180/65.2 |
| 2007/0259755 | A1 * | 11/2007 | Tanishima ........................ 477/3 |

FOREIGN PATENT DOCUMENTS

| DE | 10 2006 031 684 A1 | 1/2008 |
| EP | 1 762 417 A1 | 3/2007 |

* cited by examiner

*Primary Examiner* — Justin Holmes
(74) *Attorney, Agent, or Firm* — Davis & Bujold, PLLC

(57) ABSTRACT

A method of controlling a hybrid drive-train of a vehicle in which the hybrid drive-train comprises a combustion engine having a driveshaft, an electric machine that can be connected to the driveshaft of the engine by a clutch, an automated transmission with an input which is connected to the rotor of the electric machine, and shifting elements for shifting between two gears. During electric driving operation with the engine stopped and the clutch disengaged, the engine can be drag-started in combination with a downshift in the transmission. Drag starting of the engine is carried out by disengaging the frictional shifting element to be disengaged to below a slipping limit, engaging the clutch until the engine reaches or exceeds its minimum starting speed, starting the engine self-starts, substantially disengaging the clutch, separately adjusting the engine and electric machine to the synchronous speed of the target gear, and fully engaging and disengaging associated shifting elements.

7 Claims, 2 Drawing Sheets

METHOD FOR CONTROLLING A HYBRID DRIVE TRAIN OF A VEHICLE

This application claims priority from German patent application serial no. 10 2010 043 355.1 filed Nov. 4, 2010.

FIELD OF THE INVENTION

The invention concerns a method for controlling a hybrid drive-train of a motor vehicle, which comprises an internal combustion engine with a driveshaft, an electric machine that can be operated at least as a motor with a rotor that can be connected to the driveshaft of the internal combustion engine by means of a semi-automatic separator clutch, a semi-automatic powershift transmission having an input element which is in drive connection with the rotor of the electric machine, and with at least two frictional shifting elements for time-overlapped shifting between two gears, such that during electric driving operation with the internal combustion engine stopped and the separator clutch disengaged, the internal combustion engine is drag-started in combination with a downshift of the powershift transmission.

BACKGROUND OF THE INVENTION

A parallel-action hybrid drive-train of the type described above is generally known. Such a hybrid drive-train has the advantage that the motor vehicle concerned can optionally be driven in purely electric operation with the internal combustion engine stopped, in purely internal combustion engine operation with the electric machine switched off and delivering no force, or in hybrid operation with combined internal combustion engine and electric machine drive power. During internal combustion engine operation the electric machine can if necessary be operated as a generator to produce current for supplying an on-board electric system and/or for charging an electrical energy accumulator. In general the electric machine can also be operated as a generator when the motor vehicle is braked, and the electrical energy so obtained can be stored in an electrical energy accumulator.

The powershift transmission can be designed as a planetary automatic transmission in which, to activate the gears, in each case a number of frictional shifting elements such as shifting clutches and shifting brakes are engaged, but to change between two adjacent gears in most cases only one of the frictional shifting elements associated with the currently engaged gear is disengaged and at the same time a frictional shifting element associated with the target gear is engaged. However, the powershift transmission can also be made as a dual clutch transmission in which the input element is formed by a common clutch cage in the case of a coaxial arrangement of the two friction clutches on the input side, whereas if the two input-side friction clutches are arranged on two axis-parallel input shafts, it is formed by a driveshaft in driving connection with the two friction clutches, and with which, to change between two adjacent gears, once the transmission-interval target gear has been engaged the friction clutch associated with the current gear is disengaged and at the same time the friction clutch associated with the target gear is engaged.

With such a hybrid drive-train, if during electric driving operation the power demand increases to a level that cannot be met by the electric machine alone, the internal combustion engine has to be started in order then to drive the motor vehicle alone or in combination with the electric machine with a correspondingly larger traction force. When operating with the accelerator pedal, higher power is called for from the drive aggregate if the driver depresses the accelerator pedal farther, for example in order to accelerate the motor vehicle for the purpose of overtaking. When operating with a speed control unit higher power from the drive aggregate, for example on driving onto an uphill stretch, can be demanded by the speed control unit in order to maintain the specified nominal speed.

The electric machine may be no longer capable of delivering sufficient power because of a predetermined maximum electric machine torque determined by its design and/or because there is no longer sufficient charge in the electrical energy accumulator. If greater power is called for, then to increase the traction force in particular of the internal combustion engine it is usual for a downshift of the powershift transmission also to be triggered. If there is a need to both start the internal combustion engine and at the same time carry out a gearshift, then to carry out both processes as quickly and comfortably as possible the internal combustion engine is preferably started in combination with the gearshift, i.e. immediately before, during, or immediately after the gearshift.

For example, in a corresponding control method according to EP 1 762 417 A1 it is provided that the internal combustion engine is started by means of a drag-start immediately before an intended shift in the powershift transmission, if the shift concerned is a downshift, and that the internal combustion engine is drag-started immediately after a shift in the powershift transmission if the shift is an upshift. In this way, when the internal combustion engine is being drag-started the rotational speed difference to be bridged at the separator clutch is minimized in order to reduce the thermal loading and mechanical wear of the separator clutch. However, this control method can only be used to a limited extent because in order to drag-start the internal combustion engine, there has to be a sufficient rotational speed difference between the input side and the output side of the separator clutch.

In contrast, DE 10 2006 031 684 A1 describes a corresponding control method in which, during a simultaneous downshift of the powershift transmission, the internal combustion engine is drag-started. To do this, the frictional shifting element that is associated with the currently engaged gear and is to be disengaged, is first opened to below its slipping limit and the internal combustion engine is accelerated to above its starting speed by engaging the separator clutch. After the self-starting of the internal combustion engine, which takes place by switching on the ignition and/or the fuel injection, both drive aggregates are brought, largely together by farther engaging the separator clutch, to the synchronous speed of the target gear, before the frictional shifting element to be disengaged is fully disengaged and the frictional shifting element associated with the target gear and to be engaged is fully engaged.

By operating the frictional shifting element to be disengaged with slip, the torque and speed surges that necessarily occur when the internal combustion engine starts should be damped in relation to the powershift transmission and this increases the driving comfort of the motor vehicle concerned. However, since during the dragging and speeding up of the internal combustion engine the separator clutch is engaged progressively, the torque and speed surges coming from the internal combustion engine and the control processes of the separator clutch are increasingly transmitted to the rotor of the electric machine and from there, at least in part via the frictional shifting element to be disengaged, passed on to the powershift transmission, whereby driving comfort is reduced and the wear of gearteeth and bearings in the powershift transmission is increased.

SUMMARY OF THE INVENTION

Accordingly, the purpose of the present invention is to propose an improved method for controlling a hybrid drive-train of a motor vehicle, of the type mentioned at the start, with which drag-starting of the internal combustion engine in combination with a downshift takes place with greater driving comfort and reduced dynamic loading of the powershift transmission compared with the control method according to DE 10 2006 031 684 A1.

According to the invention this objective is achieved in that during electric driving operation with the internal combustion engine stopped and the separator clutch disengaged, the internal combustion engine is drag-started in combination with a downshift in the powershift transmission by a method having the following steps:

a) the frictional shifting element to be disengaged is opened to below its slipping limit, b) the separator clutch is engaged until the minimum starting speed of the internal combustion engine has been reached or exceeded, c) the internal combustion engine is self-started, d) the separator clutch is disengaged to a large extent, e) the internal combustion engine and the electric machine are separately adjusted to the synchronous speed of the target gear, f) the frictional shifting element to be disengaged is opened completely and the frictional shifting element to be engaged and the separator clutch are closed completely.

Thus, the invention begins with a hybrid drive-train of a motor vehicle known per se, comprising an internal combustion engine with a driveshaft, an electric machine that can be operated at least as a motor and which has a rotor that can be connected by an automated separator clutch to the driveshaft of the internal combustion engine, and a semi-automatic powershift transmission with an input element which is in driving connection with the rotor of the electric machine and with at least two frictional shifting elements for time-overlapped shifting between two gears.

Starting from electric driving operation with the internal combustion engine stopped and the separator clutch disengaged, in order to drag-start the internal combustion engine in combination with a downshift in the powershift transmission, it is provided according to the invention that the frictional shifting element associated with the currently engaged gear and which is to be disengaged is first opened to below its slipping limit. This partially decouples the electric machine from the powershift transmission and accelerates it under the effect of its own surplus torque. Then the separator clutch is engaged until the internal combustion engine has reached or exceeded its minimum starting speed, so that the internal combustion engine is dragged by the electric machine until, once the ignition and/or the fuel injection have been switched on, the internal combustion engine can operate autonomously. When the internal combustion engine has self-started the separator clutch is disengaged to a large extent again, whereby the internal combustion engine is decoupled from the electric machine and the powershift transmission. Thereafter, the internal combustion engine and the electric machine are adjusted separately to the synchronous speed of the target gear. Once both drive aggregates have reached this target speed, the downshift is completed by fully opening the frictional shifting element to be disengaged and by fully closing the frictional shifting element associated with the target gear and to be engaged, as well as the separator clutch.

The control method according to the invention therefore differs from the known control method according to DE 10 2006 031 684 A1 essentially in that after the internal combustion engine has been self-started the separator clutch is disengaged again, and the two drive aggregates are adjusted to the synchronous speed of the target gear separately, i.e. largely uncoupled from one another and each by independent control action. In this way the torque and speed surges that occur as the internal combustion engine is speeding up are largely completely kept apart from the electric machine and the powershift transmission, which results in greater driving comfort and lower dynamic loading of the electric machine and the powershift transmission.

To ensure that while the electric machine is dragging the internal combustion engine a sufficient degree of decoupling from the powershift transmission by virtue of frictional slip is achieved, it is provided that the separator clutch is not engaged in order to drag the internal combustion engine until, once the frictional shifting element to be disengaged has been opened, the electric machine has reached or exceeded a predetermined minimum rotational speed difference relative to the synchronous speed of the currently engaged gear.

In addition, improved decoupling between the internal combustion engine, the electric machine and the powershift transmission can be achieved if, from below the slipping limit at the frictional shifting element to be disengaged, the electric machine is first adjusted to an intermediate rotational speed between the synchronous speed of the currently engaged gear and the synchronous speed of the target gear and kept at that speed, and is only readjusted to the synchronous speed of the target gear when the internal combustion engine has reached or exceeded the synchronous speed of the target gear.

The intermediate speed of the electric machine is preferably set at a value which is higher than the synchronous speed of the current gear by a predetermined first minimum speed difference and lower than the synchronous speed of the target gear by a predetermined second minimum speed difference.

For the further protection of the powershift transmission from torque and speed surges, it can also be provided that the frictional shifting element to be disengaged is only opened completely and the frictional shifting element to be engaged, as well as the separator clutch, are only closed completely, when the electric machine has reached or exceeded the synchronous speed of the target gear.

If the separator clutch and the frictional shifting element to be engaged are in pressure-medium-activated form and can be engaged actively, for example if they are hydraulically actuated disk clutches, those clutch elements are preferably pre-filled during the interval up to the beginning of the drag-start-related engagement of the separator clutch. In this case the clutch elements are preferably pre-filled serially in the sequence of their subsequent closing actuation, i.e. the separator clutch is pre-filled first and then the frictional shifting element to be engaged is pre-filled.

BRIEF DESCRIPTION OF THE DRAWINGS

To clarify the invention, the description of a drawing with example embodiments is given below, the drawing showing.

DETAILED DESCRIPTION OF THE PREFERRED EMBODIMENTS

Figure 2A:
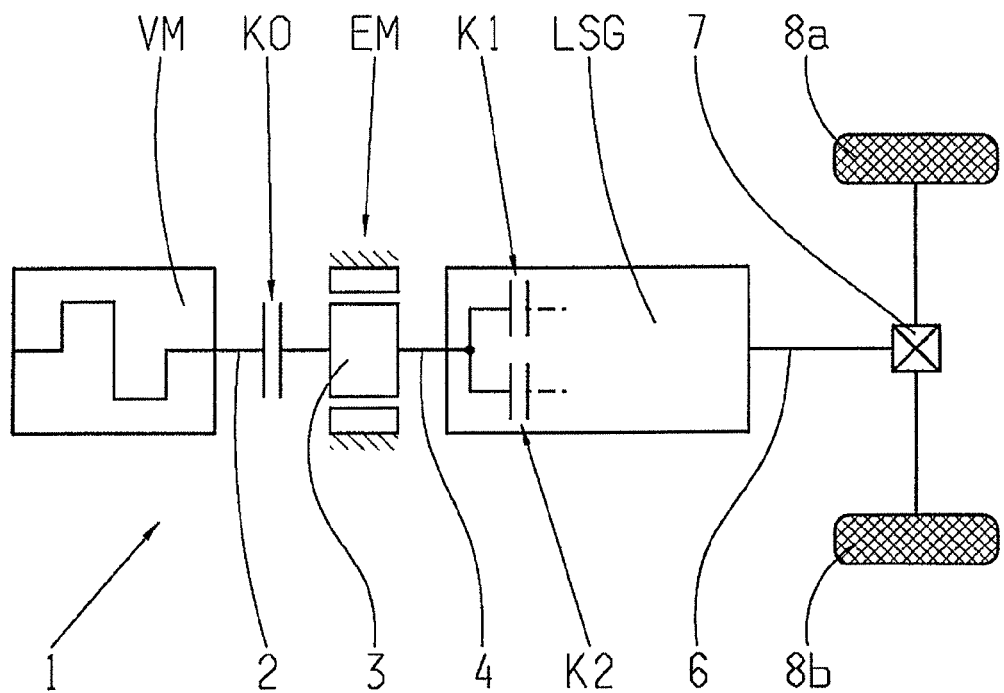
FIG. 2a: A schematic view of a parallel-action hybrid drive-train with a first embodiment of a powershift transmission for implementing the control method according to the invention according to FIG. 1a and FIG. 1b, and FIG. 2b: A schematic view of a parallel-action hybrid drive-train with a second embodiment of a powershift transmission for implementing the control method according to the invention according to FIG. 1a and FIG. 1b.
Figure 2B:
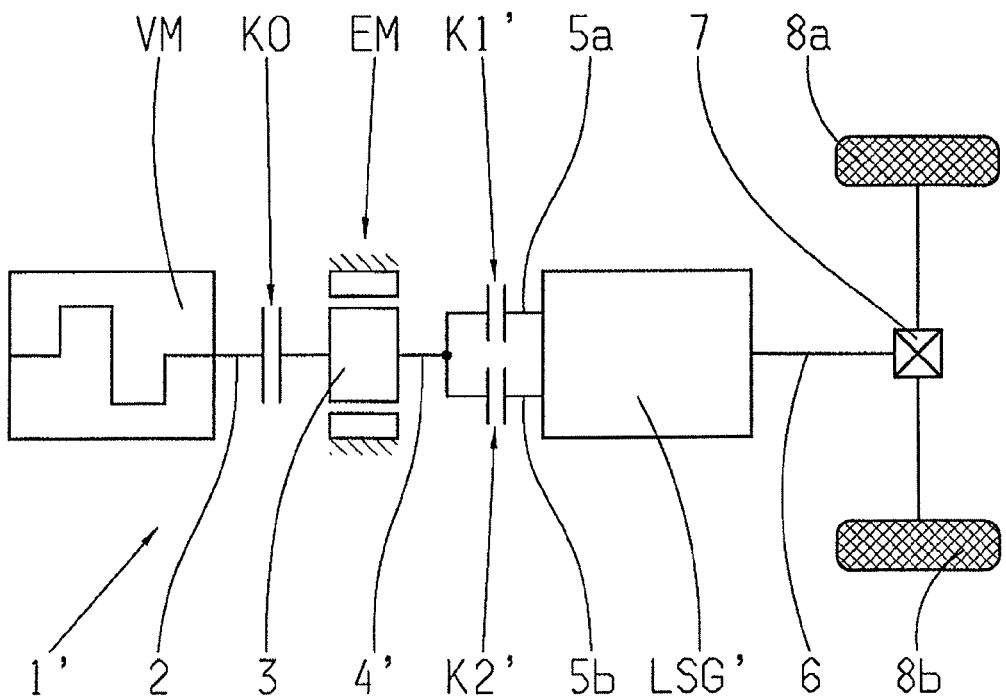

FIG. 2a and FIG. 2b show schematic representations, in each case of a parallel-action hybrid drive-train 1, 1' in which the control method according to the invention can be used. Both versions of the hybrid drive-train 1, 1' comprise an internal combustion engine VM with a driveshaft 2, an electric machine EM that can be operated at least as a motor and which has a rotor 3, and a powershift transmission LSG or LSG' respectively. In each case the rotor 3 of the electric machine EM can be connected on the input side by means of an automated separator clutch K0 to the driveshaft 2 of the internal combustion engine VM and also separated therefrom, so that when necessary the internal combustion engine can be started by the electric machine EM by being coupled to it and then decoupled from it. On the output side the rotor 3 of the electric machine EM is in each case connected to an input element 4, 4' of the powershift transmission LSG or LSG'.

In the embodiment of the hybrid drive-train 1 shown in FIG. 2a the powershift transmission LSG is in the form of a planetary automatic transmission in which, as is known, a shift between two adjacent gears takes place by the time-overlapped opening of a first, transmission-internal frictional shifting element K1 associated with the currently engaged gear and closing of a second transmission-internal frictional shifting element K2 associated with the target gear. Accordingly, the input element 4 of this powershift transmission LSG is in the form of an input shaft.

In the embodiment of the hybrid drive-train 1' shown in FIG. 2b, the powershift transmission LSG' is in the form of a dual clutch transmission with two input shafts 5a, 5b and with respective friction clutches K1', K2' on the input side. In a dual clutch transmission LSG', as is known, a shift between two adjacent gears takes place by the time-overlapped opening of the first friction clutch K1' associated with the current gear and closing of the second friction clutch K2' associated with the target gear, the target gear first being engaged in the transmission and the current gear then being disengaged in the transmission. In the case of a coaxial arrangement of the two friction clutches K1', K2' the input element 4' of the powershift transmission LSG' and the two friction clutches K1', K2' can be formed by a common clutch cage, whereas if the friction clutches K1', K2' are arranged on two axis-parallel input shafts 5a, 5b it can be formed by a driveshaft in driving connection with the two friction clutches K1', K2'.

On the output side, both versions of the powershift transmission LSG, LSG' have a respective output shaft 6 which, via an axle differential 7, is in driving connection with the driven wheels 8a, 8b of a drive axle of the motor vehicle concerned.

If a motor vehicle with such a hybrid drive-train 1, 1' is being driven by purely electric operation, i.e. with the internal combustion engine VM stopped and the separator clutch K0 disengaged, then if the power demanded by the driver or by a speed regulation unit increases it may be necessary to start the internal combustion engine VM in combination with a downshift in the powershift transmission LSG, LSG'. The reason for this measure can be a power demand so high that it can no longer be met by the electric machine alone, because of the maximum torque of the electric machine EM determined by its design and/or because the charge level of the associated electrical energy accumulator is too low.

Figure 1A:
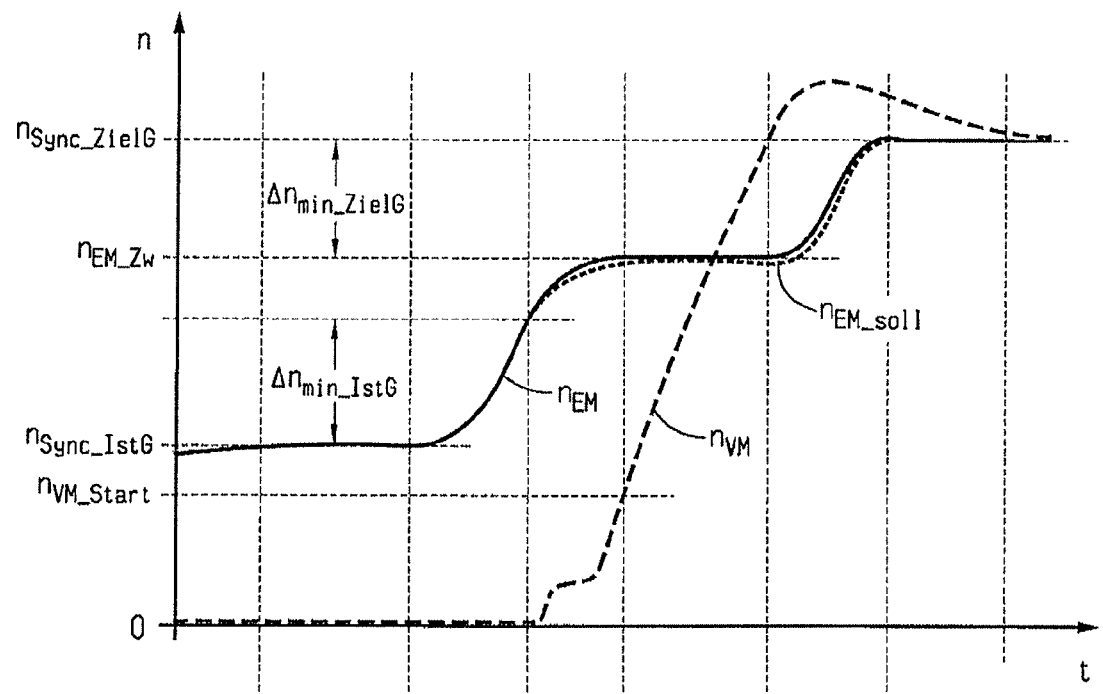
FIG. 1*a*: Rotational speed variations of an internal combustion engine and an electric machine of a parallel-action hybrid drive-train during a control sequence according to the invention for starting the internal combustion engine.
Figure 1B:
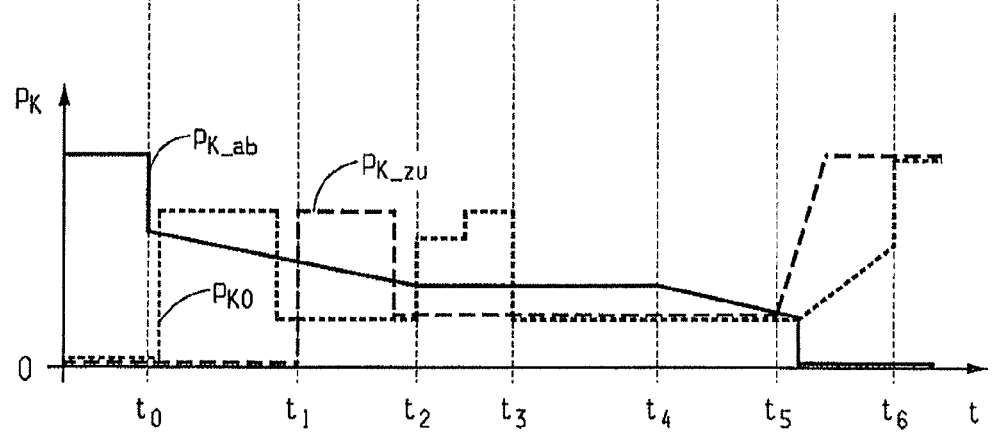
FIG. 1*b*: Control pressure variations of a separator clutch and two frictional shifting elements of a powershift transmission of a parallel-action hybrid drive-train during a control sequence according to the invention for starting the internal combustion engine.

Below, with reference to the rotational speed variations $n_{EM}(t)$ of the electric machine EM and $n_{VM}(t)$ of the internal combustion engine VM shown in FIG. 1a, and to the respective control pressure variations $p_{K0}(t)$, $p_{K\_ab}(t)$, $p_{K\_zu}(t)$ of the separator clutch K0, the frictional shifting element K_ab associated with the currently engaged gear, to be disengaged, and the frictional shifting element K_zu associated with the target gear, to be engaged, shown in FIG. 1b, in the present case the two frictional shifting elements being for example in the form of clutch elements which are pressure-medium-actuated and can be closed actively, it will now be explained how the internal combustion engine VM can be drag-started in combination with a downshift in the powershift transmission LSG, LSG' in accordance with the control method according to the invention.

Following a power demand increase at time t0, due to which the starting of the internal combustion engine VM in combination with a downshift in the powershift transmission LSG, LSG' is initiated, the frictional shifting element K_ab associated with the currently engaged gear, to be disengaged, is first opened to below its slipping limit (see $p_{K\_ab}(t)$ in FIG. 1b), whereby the electric machine EM is partially decoupled from the powershift transmission LSG, LSG'. The slipping limit of the frictional shifting element K_ab to be disengaged is reached at time t1 or the element falls below its slipping limit thereafter, whereupon the electric machine EM is accelerated under the action of its own surplus torque (see $n_{EM}(t)$ in FIG. 1a).

When a predetermined minimum rotational speed difference $\Delta n_{min\_IstG}$ relative to the synchronous speed $n_{Sync\_ZielG}$ of the current gear and hence a minimum slipping speed for decoupling the powershift transmission LSG, LSG' from the electric machine EM has been reached or exceeded at time t2 ($n_{EM} \geq n_{Sync\_IstG} + \Delta n_{min\_IstG}$), the dragging of the internal combustion engine VM begins. By this time point t2 the separator clutch K0 and the frictional shifting element K_zu to be engaged, which like the frictional shifting element K_ab to be disengaged is also designed to be pressure-medium-actuated and can be closed actively, have also been pre-filled, in this case for example serially in the sequence of their subsequent closing actuation (see $p_{K0}(t)$ and $p_{K\_zu}(t)$ in FIG. 1b).

To drag the internal combustion engine VM the separator clutch K0 is partially engaged so that the internal combustion engine turns over until at time t3 it reaches its minimum starting speed $n_{VM\_Start}$, above which the internal combustion engine VM can operate autonomously once the ignition and/or the fuel injection have been switched on. Then, to decouple the internal combustion engine VM from the electric machine EM the separator clutch K0 is to a large extent disengaged again and thereafter the two drive aggregates VM and FM are adjusted separately to the synchronous speed $n_{Sync\_ZielG}$ of the target gear.

To improve the decoupling from the powershift transmission LSG, LSG', from below the slipping limit of the frictional shifting element K_ab to be disengaged, at time t1 the electric machine EM is first adjusted in accordance with a nominal rotational speed specification $n_{EM\_soll}$ indicated in FIG. 1a to an intermediate speed $n_{EM\_Zw}$ between the synchronous speed of the currently engaged gear $n_{Sync\_IstG}$ and the synchronous speed of the target gear $n_{Sync\_ZielG}$, and held there. The electric machine EM is only adjusted from the intermediate speed $n_{EM\_Zw}$ to the synchronous speed $n_{Sync\_ZielG}$ once the internal combustion engine VM has reached or exceeded the synchronous speed $n_{Sync\_ZielG}$ of the target gear ($n_{VM} \geq n_{Sync\_ZielG}$), which is the case at time t4.

In the present case the intermediate speed $n_{EM\_Zw}$ of the electric machine EM is, for example, set at a value which is higher than the synchronous speed $n_{Sync\_IstG}$ of the current gear by more than a predetermined, first minimum speed difference $\Delta n_{min\_IstG}$ and lower than the synchronous speed $n_{Sync\_ZielG}$ of the target gear by a predetermined, second minimum speed difference $\Delta n_{min\_ZielG}$.

After the electric machine EM has reached the synchronous speed $n_{Sync\_ZielG}$ of the target gear at time t5, the frictional shifting element K_ab to be disengaged is opened completely and the frictional shifting element K_zu to be engaged and the separator clutch K0 are closed completely, this process ending at time t6.

By virtue of the greatest possible decoupling of the internal combustion engine VM from the electric machine EM and of the electric machine EM from the input of the powershift transmission LSG, LSG', the control method according to the invention ensures that torque and speed surges which occur during the dragging and starting of the internal combustion engine VM and during the subsequent speed adaptation of the two drive aggregates VM, EM are largely isolated from the powershift transmission, whereby driving comfort is increased and the dynamic loading of the powershift transmission LSG, LSG' is reduced.

INDEXES

1 Hybrid drive-train
1' Hybrid drive-train
2 Driveshaft of VM, crankshaft
3 Rotor of EM
4 Input element of LSG, input shaft
4' Input element of LSG'
5a, 5b Input shafts of LSG'
6 Output shaft of LSG, LSG'
7 Axle differential
8a, 8b Driven wheels
EM Electric machine
K_ab Frictional shifting element to be disengaged
K_zu Frictional shifting element to be engaged
K0 Separator clutch
K1 Frictional shifting element
K1' Frictional shifting element, shifting clutch
K2 Frictional shifting element
K2' Frictional shifting element, shifting clutch
LSG Powershift transmission, planetary automatic transmission
LSG' Powershift transmission, dual-clutch transmission
n Rotational speed
$n_{EM}$ Rotational speed of EM
$n_{EM\_soll}$ Nominal speed specification for EM
$n_{EM\_Zw}$ Intermediate speed of EM
$n_{Sync\_IstG}$ Synchronous speed of the current gear
$n_{Sync\_ZielG}$ Synchronous speed of the target gear
$n_{VM}$ Engine speed, rotational speed of VM
$n_{VM\_Start}$ Minimum starting speed of VM
p Pressure
$p_K$ Control pressure
$p_{K\_ab}$ Control pressure of K_ab
$p_{K\_zu}$ Control pressure of K_zu
$p_{K0}$ Control pressure of K0
t Time
t1-t6 Time points
VM Internal combustion engine
$\Delta n$ Speed difference
$\Delta n_{min\_IstG}$ First minimum speed difference from $n_{Sync\_IstG}$
$\Delta n_{min\_ZielG}$ Second minimum speed difference from $n_{Sync\_ZielG}$

The invention claimed is:

1. A method of controlling a hybrid drive-train of a motor vehicle, in which the hybrid drive-train comprises an internal combustion engine (VM) with a driveshaft (2), an electric machine (EM) that is operable at least as a motor and which has a rotor (3) that is connectable to the driveshaft (2) of the internal combustion engine (VM) by an automated separator clutch (K0), an automated powershift transmission (LSG, LSG') with an input element (4, 4') which is in driving connection with the rotor (3) of the electric machine (EM), and with at least two frictional shifting elements (K1, K2; K1', K2') for time-overlapped shifting between two gears, such that during electric driving operation with the internal combustion engine (VM) stopped and the separator clutch (K0) disengaged, the internal combustion engine (VM) can be drag-started in combination with a downshift in the powershift transmission (LSG, LSG'), the method comprising the following steps:
   disengaging a frictional shifting element (K_ab) to be disengaged to below its slipping limit;
   engaging the separator clutch (K0) until the internal combustion engine (VM) has at least reached a minimum starting speed ($n_{VM\_Start}$);
   starting the internal combustion engine (VM);
   partially disengaging the separator clutch (K0);
   separately adjusting the internal combustion engine (VM) and the electric machine (EM) to a synchronous speed ($n_{Sync\_ZielG}$) of a target gear; and
   fully disengaging the frictional shifting element (K_ab) to be disengaged and fully engaging a frictional shifting element (K_zu) to be engaged and the separator clutch (K0).

2. The method according to claim 1, further comprising the step of maintaining the separator clutch (K0) disengaged in order to drag the internal combustion engine (VM) until the electric machine (EM) has at least reached a predetermined minimum speed difference ($\Delta_{min\_IstG}$) relative to a synchronous speed ($n_{Sync\_IstG}$) of a currently engaged gear ($n_{EM} \geq n_{Sync\_IstG} + \Delta n_{min\_IstG}$).

3. The method according to claim 1, further comprising the step of first adjusting the electric machine (EM) from a value below a slipping limit of the frictional shifting element (K_ab) to be disengaged, to an intermediate speed ($n_{EM\_Zw}$) between a synchronous speed ($n_{Sync\_IstG}$) of a current gear and the synchronous speed ($n_{Sync\_IstG}$) of the target gear, and maintained there, and only adjusting the electric machine (EM) to the synchronous speed ($n_{Sync\_IstG}$) of the target gear when the internal combustion engine (VM) has at least reached the synchronous speed ($n_{Sync\_IstG}$) of the target gear.

4. The method according to claim 3, further comprising the step of setting the intermediate speed ($n_{EM\_Zw}$) at a value which is greater than the synchronous speed ($n_{Sync\_IstG}$) of the current gear by at least a predetermined, first minimum speed difference ($\Delta n_{min\_IstG}$) and less than the synchronous speed ($n_{Sync\_IstG}$) of the target gear by at least a predetermined, second minimum speed difference ($\Delta n_{min\_ZielG}$).

5. The method according to claim 1, further comprising the step of only fully disengaging the frictional shifting element (K_ab) to be disengaged and only fully engaging the frictional shifting element (K_zu) to be engaged and the separator clutch (K0) when the electric machine (EM) has at least reached the synchronous speed ($n_{Sync\_IstG}$) of the target gear ($n_{EM} \geq n_{Sync\_IstG}$).

6. The method according to claim 1, further comprising the step of if the separator clutch (K0) and the frictional shifting element (K_zu) to be engaged are pressure-medium-actuated elements that are actively engaged, pre-filling the separator clutch (K0) and the frictional shifting element (K_zu) to be engaged during the time interval (t0 to t2) until the drag-start-related engaging of the separator clutch (K0).

7. The method according to claim 6, further comprising the step of pre-filling the separator clutch and the frictional shifting element to be engaged (K0, K_zu) serially in a sequence of the separator clutch and the frictional shifting element to be engaged (K0,K_zu) subsequent serial engagement actuation.

* * * * *